(12) United States Patent
Ray (10) Patent No.: US 10,305,701 B2
(45) Date of Patent: May 28, 2019

(54) PHASE-MODULATED SIGNAL PARAMETER ESTIMATION USING STREAMING CALCULATIONS

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/652,027

(22) Filed: Jul. 17, 2017

(65) Prior Publication Data

US 2019/0020504 A1 Jan. 17, 2019

(51) Int. Cl.
*G01S 7/35* (2006.01)
*H04L 25/02* (2006.01)
*H04L 27/22* (2006.01)

(52) U.S. Cl.
CPC ........... *H04L 25/024* (2013.01); *H04L 27/22* (2013.01)

(58) Field of Classification Search
CPC ... H04L 25/024; H04L 27/2688; H04L 27/22; G01S 13/343; G01S 7/4008
See application file for complete search history.

(56) References Cited

U.S. PATENT DOCUMENTS

| | | | | |
|---|---|---|---|---|
| 4,953,145 A * | 8/1990 | Carlson | ................... | G01S 7/529 367/12 |
| 6,876,321 B1 | 4/2005 | Slutzky et al. | | |
| 7,242,346 B1 | 7/2007 | Slutzky et al. | | |
| 8,045,654 B1 * | 10/2011 | Anderson | ................ | H04B 1/69 370/210 |
| 9,046,593 B2 | 6/2015 | Ray | | |
| 9,083,350 B1 * | 7/2015 | Posner | ................... | H03F 1/3247 |
| 2003/0112914 A1 * | 6/2003 | Linsky | .................... | H04L 27/22 375/376 |
| 2006/0239338 A1 * | 10/2006 | Kolanek | ............. | H04L 27/0012 375/224 |
| 2015/0171917 A1 * | 6/2015 | Turner | .................. | G01S 19/215 375/146 |
| 2017/0176574 A1 * | 6/2017 | Eswaran | ................ | G01S 13/343 |
| 2017/0331503 A1 * | 11/2017 | Wu | ......................... | H04B 17/19 |

OTHER PUBLICATIONS

Aishwarya et al., "Pulse digitizer generator for ESM systems", Int'l J. Engineering Trends and Technology, vol. 4, Issue 9, Sep. 2013, pp. 3809-3813.

(Continued)

*Primary Examiner* — Syed Haider
(74) *Attorney, Agent, or Firm* — Ostrager Chong Flaherty & Broitman P.C.

(57) ABSTRACT

Systems and methods for detecting and estimating parameters for a phase-modulated signal in a continuous manner with near-optimal performance. The methods generate these estimates using streaming (or on-the-fly) calculations and so are suitable for hardware-based implementation. These estimates can be used as part of standard pulse descriptor words for radar and other pulsed or continuous signals that are reported by an electronic warfare receiver to a processing and display system. Also, the methods can be computed using sub-sampling methods in order to reduce overall computations.

17 Claims, 7 Drawing Sheets

(56) References Cited

OTHER PUBLICATIONS

Mahmoud et al., "Radar Parameter Generation to Identify the Target", Journal of Engineering, vol. 17, No. 1, Feb. (2011), pp. 173-185.

McGregor et al., Polynomial Fitting of Data Streams with Applications to Codeword Testing, 28th International Symposium on Theoretical Aspects of Computer Science (STACS 2011), pp. 428-439, 2011.

Chan et al., Algorithms for Computing the Sample Variance: Analysis and Recommendations. Technical Report #222, Department of Computer Science, Yale University, Jan. 1981.

* cited by examiner

PHASE-MODULATED SIGNAL PARAMETER ESTIMATION USING STREAMING CALCULATIONS

BACKGROUND

The technology disclosed herein generally relates to methods and apparatus for detecting and classifying repetitive signals.

A receiver system is any system configured to receive energy waves and process these energy waves to identify desired information carried in the energy waves. As used herein, an "energy wave" is a disturbance that propagates through at least one medium while carrying energy. For examples, energy waves may comprise electromagnetic waves, radio waves, microwaves, sound waves or ultrasound waves.

Typically, a receiver system includes a transducer and a receiver. A transducer may be any device configured to convert one type of energy into another type of energy. The transducers used in a receiver system are typically configured to receive energy waves and convert these energy waves into an electrical signal. An antenna is one example of a transducer. A receiver processes the electrical signal generated by a transducer to obtain desired information from the electrical signal. The desired information includes information about signals carried in the energy waves.

Oftentimes, energy waves are used to carry repetitive signals. A repetitive signal is a signal that has a time period over which some aspect of the signal repeats. Repetitive signals are used in timing operations, synchronization operations, radar operations, sonar operations, and other suitable operations. For example, the characteristics of a repetitive signal may be used to synchronize two or more devices.

Electronic warfare (EW) systems are receive-only systems that have front-end receivers that produce pulse descriptor words (PDWs) for each radar pulse they detect. They are unlike radar systems in that they do not naturally produce range and they must handle unknown signals rather than look for reflected versions of their transmitted signals. The digital versions of these receivers are typically designed as a filter bank; within each filter channel, radar pulses are separated from other coincident signals and have their noise decreased by the relative filter bandwidth compared to the total input bandwidth. These pulses with their increased signal-to-noise ratio (SNR) are processed to estimate PDW elements such as pulse width, frequency, time of arrival, bandwidth, and amplitude. While channelizers have many advantages, they also have key disadvantages such as large size, weight and power due to the multipliers and adders required for very large filter banks that operate continuously whether a signal is present or not. In addition, signals that do not match the bandwidth and frequency of each filter in the filter bank are processed sub-optimally or split across filter channels, resulting in missed, false and inaccurate PDWs.

If a channelizer is not used, the two main processing tasks of noise reduction and signal separation must be done using different methods. Noise reduction can be done using denoising techniques which model signals via adaptive recursive equations that enhance the structure of signals and consequently reduce the unstructured signal noise. Signal separation requires constructing on-the-fly real-time automated matched filter construction. These filters are constructed and changed in real time to find new signals, track them and hold during difficult SNR conditions. Under these dynamic conditions, the pulse parameters must also be measured at the output of a tracking filter.

Systems are known in which PDWs are generated based on respective blind source separated signals output by tracking filters of a blind source separation system. Each PDW may contain data representative of signal characteristics of interest derived from a singular pulse of blind source separated signal, such as phase modulation parameters, frequency, bandwidth, time of arrival, time of departure, pulse width, pulse amplitude, pulse repetition interval, and/or angle of arrival.

In some systems, the generation of PDWs includes a process for phase modulation estimation of incoming radar. Some previous solutions for phase modulation estimation of radar signals typically use Fourier transform methods, which are complicated in hardware implementations and typically require full-bandwidth sampling of the phase-modulated signal. Alternatively, the signal can be mixed down to baseband and then Fourier methods can be used at the baseband bandwidth. This has two disadvantages. One is that this method creates noise mixing products that reduce the accuracy of the parameter estimates. Another is that the sampling rate of the estimation must still operate at the baseband bandwidth, while the phase modulation is very simple and can be inferred more directly at even lower samples rates. In addition, solutions that use Fourier transforms are difficult to make in a streaming form implementable by means of a field-programmable gated array (FPGA) or an application-specific integrated circuit (ASIC). Also, other solutions are quite often not easily designed for sub-sampling implementations.

It would be desirable to provide enhanced systems and methods for detecting and estimating parameters of a phase-modulated signal in a continuous manner.

SUMMARY

The subject matter disclosed in detail below is directed to systems and methods for detecting and estimating parameters for a phase-modulated signal in a continuous manner with near-optimal performance. In particular, these methods can be used in a blind source separation system (hereinafter "BSS system"). The methods disclosed in some detail below can generate these estimates using streaming (or on-the-fly) calculations and so are suitable for FPGA or ASIC or other hardware-based implementation. These estimates can be used as part of standard pulse descriptor words (PDWs) for radar and other pulsed or continuous signals that are reported by a BSS system or any electronic warfare (EW) receiver to an EW processing and display system. Also, the methods disclosed below can be computed using sub-sampling methods in order to reduce overall computations. Finally, the architecture presented can be used together with any other type of streaming signal parameter estimation methods in a common architecture and interface specification.

The system disclosed in some detail below allows for reliable low-latency detection of a signal present on the output of a blind source separation channel (hereinafter "BSS channel") and reliable low-latency estimation of the pulse parameters of the separated signal out of the BSS channel. It can be used as part of either a traditional EW channelizer or BSS-based EW receiver to continuously classify the separated signals using PDWs. It derives frequency and frequency change rate, for example, on a continuous basis and is also able to detect such phase-modulated signals with particular phase parameters with very low false alarm rates. Also, this approach can operate as part of an architecture that can be used in conjunction with any other type of streaming signal parameter estimation methods in a common architecture and with a common interface to an EW processing and display system.

Although various embodiments of systems and methods for detecting phase-modulated signals and estimating parameters for those phase-modulated signals will be described in some detail below, one or more of those embodiments may be characterized by one or more of the following aspects.

One aspect of the subject matter disclosed in some detail below is a method for estimating parameters of a phase-modulated signal in a streaming manner, comprising: (a) sampling a received signal to produce signal samples; (b) estimating a respective instantaneous signal phase of the received signal for each signal sample; and (c) estimating coefficients of a polynomial function that best fits the instantaneous signal phases estimated in step (b) within an estimation time window of a first specified length. The coefficients are estimated in step (c) using polynomial regression, not Fourier transforms. This method may further comprise: (d) calculating a detection value based on a detection time window of a second specified length of the signal samples; (e) comparing the detection value to a detection constant; and (f) discontinuing step (c) in response to the detection value being less than the detection constant.

In accordance with one embodiment of the method described in the preceding paragraph: step (a) comprises sub-sampling; step (b) comprises converting the signal samples into filtered and delayed signals using a Hilbert filter and a matched delay arranged in parallel, applying a phase estimation technique to the delayed and filtered signals, and unwrapping the signal phases output by the phase estimator; and step (f) comprises real-time windowed variance estimation and a parallel streaming computation that acquires a best modulo value within the detection time window of signal samples.

Another aspect of the subject matter disclosed in some detail below is a method for detecting a phase-modulated signal in a streaming manner, comprising: (a) selecting a detection constant associated with a false alarm rate; (b) sampling a received signal to produce signal samples; (c) estimating a respective instantaneous signal phase of the received signal for each signal sample; (d) calculating a detection value based on a detection time window of a first specified length of the signal samples; and (e) determining whether the detection value is greater than the detection constant or not. This method may further comprise: (f) estimating coefficients of a polynomial function that best fits the instantaneous signal phases estimated in step (b) within an estimation time window of a second specified length only if the detection value is greater than the detection constant; and (g) generating information vectors comprising respective data sets of parameter values of received signals, wherein each data set of parameter values making up an information vector comprises the coefficients estimated in step (f).

A further aspect of the subject matter disclosed below is a system for estimating parameters of a phase-modulated signal in a streaming manner, comprising: a transducer for converting received energy waves into a received signal in electrical form; a filter for passing a portion of the received signal having a frequency within a selected frequency bandwidth; a sampler comprising hardware or firmware configured to sample the received signal output by the filter to produce signal samples; a phase estimator comprising hardware or firmware configured to estimate a respective instantaneous signal phase of the received signal for each signal sample; and a phase modulation parameter estimator comprising hardware or firmware configured to estimate coefficients of a polynomial function that best fits the instantaneous signal phases estimated by the phase estimator within an estimation time window of a first specified length. This system may further comprise a phase modulation detector configured to calculate a detection value based on a detection time window of a second specified length of the signal samples, wherein the phase modulation parameter estimator further comprises hardware or firmware configured to determine whether the detection value is greater than the detection constant or not and to not estimate coefficients if the detection value is less than the detection constant.

Other aspects of systems and methods for detecting and estimating parameters for phase-modulated signals are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of systems for detecting and estimating parameters for phase-modulated signals are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system disclosed herein takes as input a sampled form of a received signal $\{x_n\}$ and does two things. It detects when polynomial phase-modulated signals are present and it estimates fixed parameters in the polynomial phase-modulated signals. These are common types of modulations of radar signals. In particular, the canonical example of such signals is a sinusoidal signal which increases or decreases its frequency in a linear fashion. This is commonly called a linear chirp and is described by the following equation:

$$s(t)=e^{2\pi i(at^2+bt+c)} \quad (1)$$

where t varies over time and a, b, c are constant parameters that control the chirp rate. Such a signal has many applications in radar for range and range rate measurement. It is typically defined by one parameter set $\{a_{up}, b_{up}, c_{up}\}$ (say an up chirp for each period) or by a period pair, an up chirp which increases in frequency and a down chirp which decreases in frequency. These period pairs would then have a pair of parameter sets $\{a_{up}, b_{up}, c_{up}\}$ and $\{a_{down}, b_{down}, c_{down}\}$ associated with them.

To detect such a signal, the system disclosed herein continuously produces a detection value $\hat{d}(W_D)$ based on a window $W_D$ of signal samples $\{x_{n-m+1}, \ldots, x_n\}$ corrupted by noise of length m and the signal is then declared to be present at any given time if $$\hat{d}(W_D) \leq T(\mathrm{FAR})$$

where T(FAR) is a detection constant chosen by the user associated with a desired false alarm rate (FAR). Otherwise, the signal is not declared present if $$\hat{d}(W_D) > T(\mathrm{FAR})$$

The general concept of false alarm rate with reference to signal detection is discussed by Whalen in "Detection of Signals in Noise", $1^{st}$ Ed., Academic Press (1971).

Similarly, to estimate the parameters of a signal, the system disclosed herein takes an estimation window of length $W_E$ of signal samples $\{x_{n-m+1}, \ldots, x_n\}$ corrupted by noise of length m and continuously produces a parameter set $\{\hat{a}(W_E), \hat{b}(W_E), \hat{c}(W_E)\}$ that represents at any given moment estimates of the correct parameters $\{a, b, c\}$.

In the general signal (not just the linear chirp) case, a phase-modulated signal can defined as $$s(t)=e^{2\pi i f(t)} \quad (2)$$

where $f(\underline{t})$ is a real-valued function with parameter vector of length D. Thus, $f(\underline{t})$ could be a polynomial $p_D(\underline{t})$ of degree (D−1) and have D coefficients as parameters in the general case. Also, the more general modulation function $f(\underline{t})$ could be first approximated by a polynomial $p_D(\underline{t})$ and then estimated using the methodology disclosed herein. When the degree is 2, this would be the linear chirp signal above. The following disclosure focuses on the linear chirp, but what is described can apply to a polynomial phase modulation (Eq. (2)) as well as to phase modulations that can be closely approximated by polynomial phase modulations.

In accordance with some embodiments, the system incorporates the following features: (a) accurate phase-modulated signal parameter estimation and detection using time domain sampling and computation; (b) the estimation and detection can be done in a streaming fashion, without the usage of large memories and block processing and thus avoiding additional latency; (c) sub-sampling of the signal can be used to reduce computation in the estimation process; and (d) the same architecture of this phase modulation detector and parameter estimator can be used together with any other type of streaming signal parameter estimation methods in a common architecture and interface specification. The results would be sent to an EW processing and display system which includes subsystems such as a deinterleaver, a geolocation engine, and a radar report generator.

The foregoing features provide benefits, including but not limited to accurate signal parameter estimation for phase-modulated signals without complex Fourier transform computations and without full bandwidth processing. This leads to higher-quality signal separation and characterization using less hardware, size and power and therefore enables EW receivers that are smaller and less costly and use less power. Correspondingly, this also can enable higher-performance EW receivers than are currently possible by enabling accurate signal extraction and characterization under more difficult signal environments than previously. Also, this would enable more signals to be simultaneously detected and tracked for a given amount of hardware resources.

For the sake of illustration, an embodiment will now be described that separates incoming radar pulses and then generates pulse descriptor words (PDWs) for use in controlling a vehicle. However, it should be appreciated that the BSS subsystem disclosed herein may be used in applications other than vehicle control.

Figure 1:
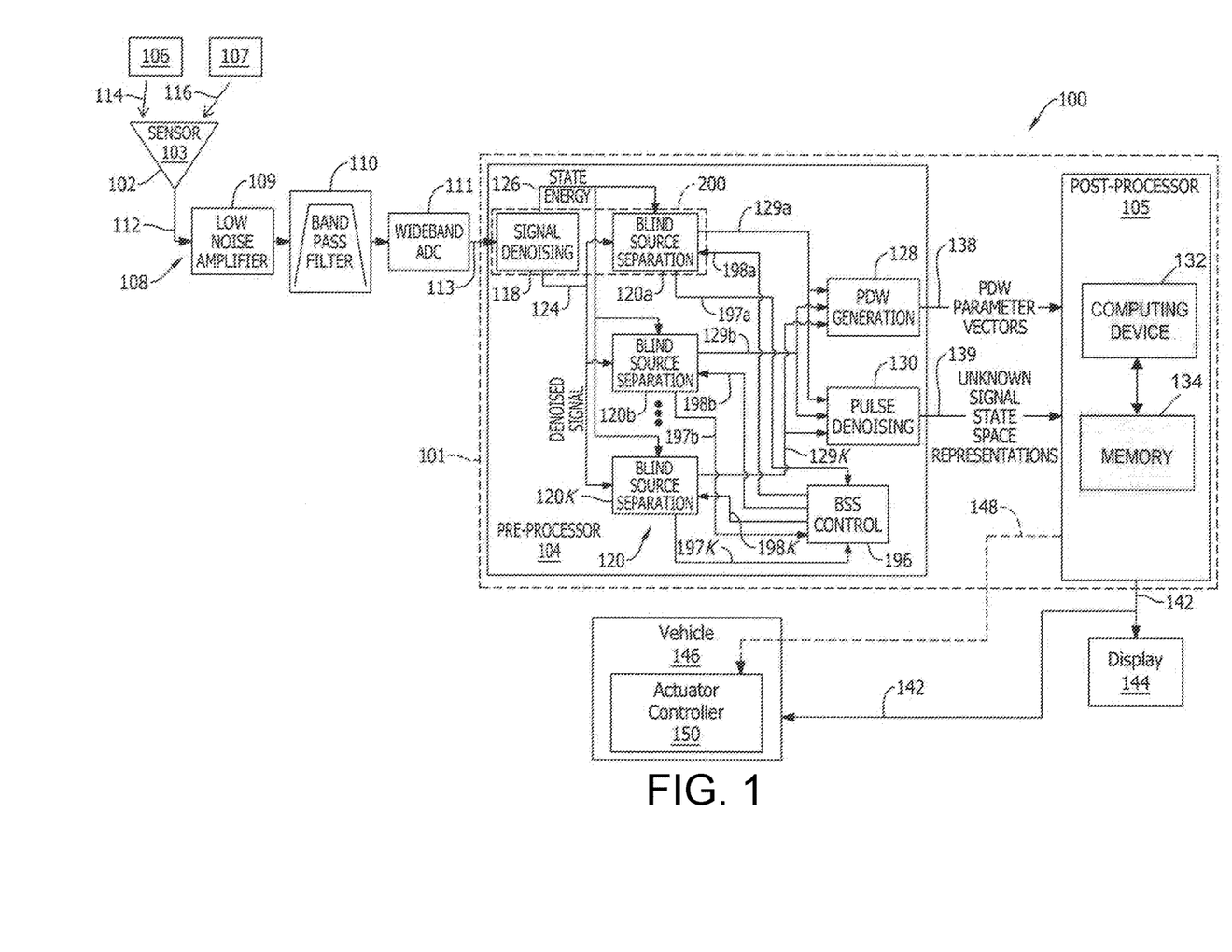
FIG. 1 is a block diagram showing a denoising and BSS architecture incorporated in a signal processing system for generating pulse descriptor words (PDWs) using blind source separation.

FIG. 1 is a block diagram identifying components of a signal processing system 100 for generating PDWs using blind source separation (BSS). Also known as blind signal separation, BSS subsystems and methods are employed for separation (i.e., filtering) of one or more source signals of interest from a plurality of mixed signals. In applications including, without limitation, an underdetermined case (i.e., fewer observed signals than signal sources), blind source separation facilitates filtering pure signals of interest from an arbitrary set of time-varying signals (e.g., radar pulses from one or more signal emitters) without relying on substantial amounts of known information about the source signals or the signal mixing process.

FIG. 1 shows an example BSS subsystem of an EW receiver. (Note that the techniques being described herein could also be used in a traditional channelizing receiver.) The BSS architecture shown in FIG. 1 includes a number of BSS channels 200 containing tunable filters (typically with center frequency and bandwidth as parameters), each of which produces a (presumed) unique separated denoised signal at its output. The maximum number of separated signals at any given time is limited by K, the total number of such BSS channels. The output of each channel is fed into a PDW generation module 128. The system for detecting phase-modulated signals and estimating parameters for those phase-modulated signals disclosed in detail below operates within the PDW generation module 128 and takes separated signals from each BSS channel and produces PDW parameter vectors as output.

The system depicted in FIG. 1 will now be described in some detail. Further details regarding this system are disclosed in U.S. patent application Ser. No. 15/296,233, the disclosure of which is incorporated by reference herein in its entirety.

In an exemplary implementation, signal processing system 100 includes a signal data processor 101 communicatively coupled to an antenna 102 by way of a pre-conditioner 108. Antenna 102, in the exemplary implementation, is embodied as a wide-area sensor 103. Signal data processor 101 includes a pre-processor 104 and a post-processor 105. Sensor 103 is configured to surveil at least one radar signal emitter (two radar signal emitters 106 and 107 are indicated). In one implementation, pre-conditioner 108 includes at least one electronic component (e.g., a low-noise amplifier 109, a band pass filter 110, and a wideband analog-to-digital converter (ADC) 111) configured to pre-condition a sensor output signal 112. In operation, pre-conditioner 108 is configured to convert a sensor output signal 112 received from sensor 103 into a conditioned signal 113 transmitted to pre-processor 104. Each conditioned signal 113 is derived from a time-varying signal received at sensor 103. Time-varying signals may include a mix of signals received from radar signal emitters 106 and 107. For example, time-varying signals may include a first radar signal 114 generated by radar signal emitter 106 or a second radar signal 116 generated by radar signal emitter 107, which signals are received by sensor 103.

In the exemplary embodiment, pre-processor 104 includes one or more signal denoising modules 118, and a plurality of blind source separation (BSS) modules 120. Each BSS module 120 is coupled to a single signal denoising module 118, and represents one BSS channel 200. A total number of BSS channels 200 in signal processing system 100 is expressed as K. Signal denoising module 118 transmits a denoised signal 124 and a state energy signal 126 to each respective BSS module 120 (e.g., 120a, 120b, . . . , 120K) of the plurality of BSS modules 120. State energy signal 126 represents a quantity (e.g., an analog voltage level) that is proportional to the sum of the absolute value of an amplitude of incoming signal 113 squared at particular sampled time points (i.e., states).

In operation, incoming signal 113 is transmitted from pre-conditioner 108 to signal denoising module 118, where incoming signal 113 undergoes signal denoising and is subsequently transmitted as denoised signal 124 to each BSS module 120. For example, first radar signal 114 is initially received at sensor 103 as a pulse having signal characteristics including, without limitation, a frequency and a bandwidth. In this example, a single pulse of first radar signal 114, after processing by pre-conditioner 108, is then received at signal denoising module 118 as a mixed signal (i.e., the incoming signal 113 represents a signal pulse of the first radar signal 114 and has various characteristics including, without limitation, noise and information other than the desired information of interest). Signal denoising module 118 denoises the mixed incoming signal 113 prior to transmitting denoised signal 124 having a frequency and a bandwidth (or a regular pattern of frequencies and bandwidths) to the BSS modules 120. Methods implemented by signal processing system 100 are performed in substantially real time by the devices and systems described above.

Pre-processor 104 further includes a BSS control module 196 coupled to each BSS module 120. BSS control module 196 is configured to transmit a respective BSS control signal 198a through 198K to each of BSS modules 120. The plurality of BSS modules 120 connected to the BSS control module 196 will be referred to herein as the "BSS subsystem".

Further, in an exemplary implementation, pre-processor 104 comprises a PDW generation module 128 and a pulse denoising module 130, both of which are coupled to receive blind source separated signals 129 from a plurality of BSS modules 120 of a BSS subsystem. PDW generation module 128 generates PDW parameter vector signals 138 based on respective blind source separated signals 129 (e.g., 129a, 129b, . . . , 129K) received from the BSS modules 120 (e.g., 120a, 120b, . . . , 120K). Each PDW parameter vector signal 138 contains data representative of characteristics of interest of one of radar signals 114 and 116 derived from a singular pulse of blind source separated signal 129 (e.g., frequency, bandwidth, time of arrival, time of departure, pulse width, pulse amplitude, pulse repetition interval, and/or angle of arrival (AOA)). Pulse denoising module 130 also generates an unknown signal state space representation signal 139 based on blind source separated signals 129. Unknown signal state space representation signal 139 contains data representative of additional (e.g., non-PDW-type) characteristics of interest of one of radar signals 114 and 116 from which usable spatial information about one of radar signal emitters 106 and 107 is discernable. PDW parameter vector signals 138 and unknown signal state space representation signals 139 are transmitted to post-processor 105.

Signal denoising module 118, PDW generation module 128, and pulse denoising module 130 include suitable signal filtering, signal amplification, signal modulation, signal separation, signal conditioning, and/or ADC circuitry implemented using analog and/or digital electronic circuit components. Also, in the exemplary embodiment, each BSS module 120 (e.g., 120a, 120b, . . . , 120K) transmits a respective blind source separated signal 129 (e.g., 129a, 129b, . . . , 129K) to PDW generation module 128 and to pulse denoising module 130. Each BSS module 120 may be implemented in firmware on a field-programmable gated array (FPGA) or in pure hardware in an application-specific integrated circuit (ASIC). Alternatively, each BSS module 120 may be implemented as software running on a processor.

Further, in an exemplary implementation, post-processor 105 comprises a computing device 132 and a memory 134. The memory 134 comprises one or more non-transitory tangible computer-readable storage media. Post-processor 105 is communicatively coupled to pre-processor 104. In accordance with one embodiment, the computing device 132 is a processor running software.

In accordance with some embodiments, the PDW generation module 128 is configured to receive a respective blind source separated signal 129 from each BSS module 120. PDW generation module 128 is further configured to transmit a PDW parameter vector signal 138 to post-processor 105. PDW parameter vector signal 138 received by computing device 132 is stored as computer-readable data in memory 134 including, without limitation, as at least one buffered data set.

In accordance with one implementation, the PDW generation module 128 will send each PDW to the computing system 132 as a PDW parameter vector signal 138 similar to (amplitude, time of arrival, center frequency, pulse width and bandwidth)=(amp, toa, cf, pw, bw). The PDW for each intercepted signal is stored in a pulse buffer for further processing by the computing system 132. As part of such processing, the PDWs are sorted and deinterleaved by clustering the incoming radar pulses into groups. In principle, each group should have characteristics representative of a single radar source or class of radar sources which allows that radar source or class to be identified. The identity of a particular signal is usually inferred by correlating the observed characteristics of that signal with characteristics stored in a list that also contains the identity of known radars. In addition to comprising a deinterleaver that identifies the radar emitter, the computing system 132 further comprises a geolocation engine for determining the coordinates of the location of the identified radar emitter.

In accordance with some embodiments, the pulse denoising module 130 is configured to receive blind source separated signals 129 from each BSS module 120. Pulse denoising module 130 is further configured to transmit an unknown signal state space representation signal 139 to post-processor 105. Unknown signal state space representation signal 139 received by computing device 132 is stored as computer-readable data in memory 134, including, without limitation, as at least one buffered data set. In an exemplary implementation, computing device 132 fetches buffered data sets from memory 134 for processing using a computer-based method employing an operating system running software executed from instruction set data also stored in memory 134.

The computing device 132 is configured to perform operations based on data contained in the PDW parameter vector signals 138 and unknown signal state space representation signals 139. Such operations include, without limitation, detecting, processing, quantifying, storing, and controlling a display device 144 for displaying (e.g., in human-readable data form) various characteristics of at least one of the radar signals 114 and 116 represented as data in the PDW parameter vector signals 138 and unknown signal state space representation signals 139. For example, a PDW parameter vector signal 138 generated by PDW generation module 128 may contain a plurality of PDW vector data blocks structured in a vector format, where each PDW vector data block contains one parameter of the first radar signal 114. Parameters representative of at least one characteristic of the first radar signal 114 contained in one PDW vector data block may include, without limitation, frequency, bandwidth, time of arrival, time of departure, pulse width, pulse amplitude, pulse repetition interval, and/or AOA. The computing device 132 is configured to read at least a portion of PDW parameter vector signal 138 and carries out at least one of the aforementioned operations on at least one PDW vector data block. Also, in an exemplary implementation, the computing device 132 is configured to read and separate (i.e., deinterleave) PDW parameter vector signal 138 into its constituent PDW vector data blocks, and store fewer PDW vector data blocks including, without limitation, at least one predetermined type of information, in memory 134 than the total number of PDW vector data blocks contained in PDW parameter vector signal 138. In other implementations, the computing device 132 is configured to read and separate all PDW vector data blocks from one another and store all data contained therein in memory 134. The computing device 132 can also be configured to facilitate the aforementioned operations substantially simultaneously (i.e., in real time) with receipt of at least one of the plurality of radar signals 114 and 116 by the sensor 103.

Resultant data from operations performed by the computing device 132 are stored in memory 134. Further, in the exemplary implementation, computing device 132 causes post-processor 105 to transmit a human-readable data signal 142 to a human machine interface to facilitate at least one of an interaction, a modification, a visualization, at least one further operation, and a viewable recording of information about at least one radar signal 114 and 116 by a user of signal processing system 100. The human machine interface may be, for example, a display device 144 which receives the human-readable data signal 142 from post-processor 105. In one example, characteristics of radar signal emitters 106 and 107 determined by signal processing system 100 are displayed on display device 144 as a map having a grid representative of a physical spatial domain including a surveillable space of sensor 103, where locations and identifying information of radar signal emitters 106 and 107 are displayed and plotted substantially in real time. The human-readable data signal 142 may also be transmitted from post-processor 105 to at least one device and/or system (e.g., an aerial or ground-based vehicle 146) associated with signal processing system 100. Further, the computing device 132 enables post-processor 105 to transmit, in substantially real time, an actuator control signal 148 to an actuator controller 150 included within vehicle 146 to direct or control movements thereof. For example, vehicle 146 may be a remotely and/or autonomously operated land vehicle or an unmanned aerial vehicle.

In operation, conditioned signal 113 is received by signal denoising module 118, where it undergoes signal denoising. The denoised signal 124 is transmitted to each BSS module 120. For example, first radar signal 114 may be transmitted to sensor 103 by first radar signal emitter 106 as a pulse having signal characteristics including, without limitation, a frequency (e.g., a center frequency) and a bandwidth. In this example, a single pulse of first radar signal 114 is received at signal denoising module 118 as a mixed signal (i.e., a signal pulse having various characteristics including, without limitation, noise and information other than the desired information of interest). Signal denoising module 118 denoises the mixed signal prior to transmitting a denoised signal 124 having a frequency and a bandwidth (or a regular pattern of frequencies and bandwidths). Methods implemented by signal processing system 100 are performed in substantially real time by the devices and systems described above.

In one mode of operation, at least one of frequency and bandwidth information contained in respective PDWs is plotted on a map on the display device 144 along with locations of respective radar signal emitters 106 and 107 to facilitate accurate tracking of locations and association with those particular radar signal emitters. In cases where at least one radar signal emitter is mobile, the map on display device 144 updates location information of at least one respective mobile radar signal emitter in substantially real time. Furthermore, the computing device 132 determines at least one of a velocity, an acceleration, a trajectory, and a track (i.e., including present and prior locations) of one or more mobile radar signal emitters (e.g., radar signal emitters 106 and 107). In another mode of operation, characteristics determined by signal data processing methods implemented by the signal data processor 101 may trigger a variety of substantially real-time physical actions in physical devices and systems in communication with the signal processing system 100. For example, characteristics of various radar signal emitters, including frequency and bandwidth determined by signal data processing methods implemented by signal processing system 100, may be transmitted in substantially real time as data to actuator controller 150 in vehicle 146 (e.g., rudders and flaps of a unmanned aerial vehicle) to direct movement or facilitate maneuvers thereof, for example, to avoid an area of operation of an unauthorized radar signal emitter determined to be a threat or to move toward the unauthorized emitter to eliminate the threat. As a further example, characteristics of radar signal emitters 106 and 107 determined by signal data processing methods described herein may be transmitted in substantially real time in a control signal to at least one of an electronic support measure (ESM) device and an electronic warfare (EW) system associated with signal processing system 100 to direct, for example, a radar jamming signal at a particular radar signal emitter operating in the surveillable environment of sensor 103 without authorization.

Each BSS module 120 in signal processing system 100 implements filtering methods with dynamic updating to generate high-quality PDWs containing at least one of amplitude, frequency, center frequency, bandwidth, pulse time of arrival, and pulse width information. Such improved accuracy and resolution of PDWs to track, for example, frequency and bandwidth of, for example, individual radar signals facilitates at least one of identifying, determining, and analyzing at least one radar signal emitter from which associated radar signals are emitted. For example, information including, without limitation, information derived from PDWs from at least one of the radar signal emitters 106 and 107 may be displayed on display device 144 after being transmitted thereto by post-processor 105 as human-readable data signal 142, as described above. This enhanced information enables signal processing system 100 to distinguish first radar signal emitter 106 from second radar signal emitter 107. Also, for example, different radar signal emitters in a surveilled environment of sensor 103 may be plotted at respective locations (i.e., grid coordinates) on display device 144 (i.e., as a map).

Also, in operation, each BSS module 120 separates a respective denoised signal 124. Each BSS module 120 contains a plurality of tunable filters, wherein each filter operates in accordance with filter parameters that include, without limitation, a center frequency and a bandwidth. Further, in the exemplary embodiment, pre-processor 104 includes a BSS control module 196, which facilitates controlling BSS modules 120. BSS control module 196 receives respective BSS data signals 197 (e.g., 197a, 197b, . . . , 197K) containing BSS-related information including, without limitation, frequency, bandwidth, and state, from each BSS module 120. Based on the BSS-related information contained in BSS data signals 197, BSS control module 196 also generates and transmits respective BSS control signals 198 (e.g., 198a, 198b, . . . , 198K) back to each respective BSS module 120 to control, for example and without limitation, a timing of receipt of denoised signal 124 and transmission of respective blind source separated signals 129 to at least one of PDW generation module 128 and pulse denoising module 130. Information contained in BSS data signals 197 and BSS control signals 198 is used by BSS control module 196 to facilitate implementation of a feedback control loop. The BSS control module 196 is further configured to tune (i.e., update) the center frequency and bandwidth of each filter of the plurality of filters in each BSS module 120 to enable radar signals which fall within the input bandwidth to be separated out in consistent BSS channels. BSS control module 196 also implements scheduling of fixed filter resources in each BSS module 120, which facilitates separation of denoised signals 124 with as few missed signals as possible given the filter resources available.

In accordance with one embodiment, BSS control module 196 comprises a processor running software. All of the other modules inside pre-processor 104 can be implemented in a processor running software or in firmware on an FPGA or in pure hardware in an ASIC. And these could be mixed, some in hardware and some in software. However, the most reasonable implementation would be in hardware or in an FPGA for the other modules inside the pre-processor 104.

The aforementioned filtering methods enable signal processing system 100 to generate high-quality PDW parameter vector signals 138 that are used for identifying, determining, and analyzing radar signal emitters 106 and 107. For example, PDW parameter vector signals 138 associated with radar signal emitter 106 are displayed on display 144, as described above. Also, for example, improved information about frequencies and/or bandwidths contained in at least two PDW parameter vector signals 138 enable signal processing system 100 to distinguish first radar signal emitter 106 from second radar signal emitter 107. These radar signal emitters 106 and 107 are plotted at respective locations on display 144 (e.g., as a map).

As previously mentioned, the PDW generation module 128 identified in FIG. 1 receives blind source separated signals 129 from the BSS modules 120 and generates PDW parameter vector signals 138. Each PDW parameter vector signal 138 contains data representative of characteristics of interest such as phase modulation parameters, frequency, bandwidth, time of arrival, time of departure, pulse width, pulse amplitude, pulse repetition interval, and/or angle of arrival.

The present disclosure is directed toward improvements in the detection of phase-modulated signals and estimation of the phase modulation parameters of those detected signals. In accordance with some embodiments, the presence of a phase-modulated signal is detected and phase modulation parameters are estimated by electronic circuitry (e.g., an FPGA or ASIC) that is incorporated in the PDW generation module 128. That circuitry takes separated signals from each BSS channel and produces a stream of PDW parameter vectors (i.e., electrical signals representing the elements making up the PDW parameter vector) as output.

Figure 2:
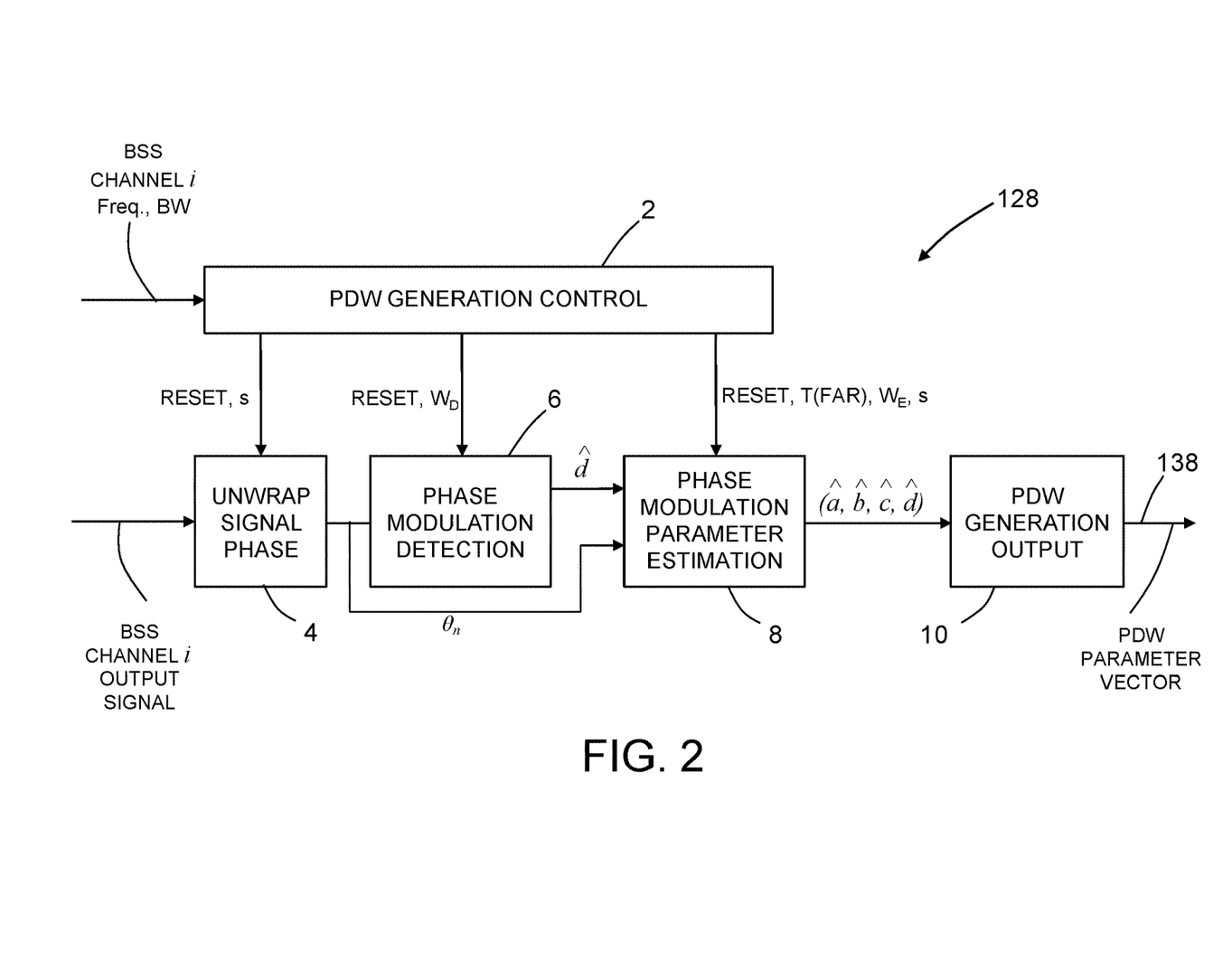
FIG. 2 is a block diagram identifying components of a subsystem for detecting phase-modulated signals and estimating phase modulation parameters of the detected signals in accordance with one embodiment.

FIG. 2 is a block diagram identifying some components of a subsystem for detecting phase-modulated signals and estimating phase modulation parameters of the detected signals. In accordance with one embodiment, the system comprises the following components: an unwrapped signal phase estimator 4, a phase modulation detector 6 and a phase modulation parameter estimator 8. These components, which are implemented as firmware or hardware (e.g., FPGA or ASIC), receive reset signals from a PDW generation control module 2. The unwrapped signal phase estimator 4 receives a signal stream from a BSS channel 120 (see FIG. 1). The unwrapped signal phase estimates are output in parallel to the phase modulation detector 6 and the phase modulation parameter estimator 8. The phase modulation detector 6 continuously produces signals representing detection values $\hat{d}$ based on a window of signal samples, as previously described. The phase modulation parameter estimator 8 receives the unwrapped signal phase estimates $\theta_n$ output by the unwrapped signal phase estimator 4 and the detection values $\hat{d}$ output by the phase modulation detector 6 and then converts the received data into a set of estimated parameter values $\{\hat{a},\hat{b},\hat{c}\}$ (also referred to herein as "polynomial coefficients"). The phase modulation parameter estimator 8 outputs the estimated parameter values $\{\hat{a},\hat{b},\hat{c}\}$ and the detection values $\hat{d}$ to the PDW generation output module 10, which in turn outputs PDW parameter vector signals 138 (i.e., signals representing information vectors comprising respective data sets of parameter values of received signals) which contain data representing $\{\hat{a},\hat{b},\hat{c},\hat{d}\}$. Each PDW parameter vector signal 138 further contains data representative of signal characteristics of interest (e.g., frequency, bandwidth, time of arrival, time of departure, pulse width, pulse amplitude, pulse repetition interval, and/or angle of arrival).

Figure 3:
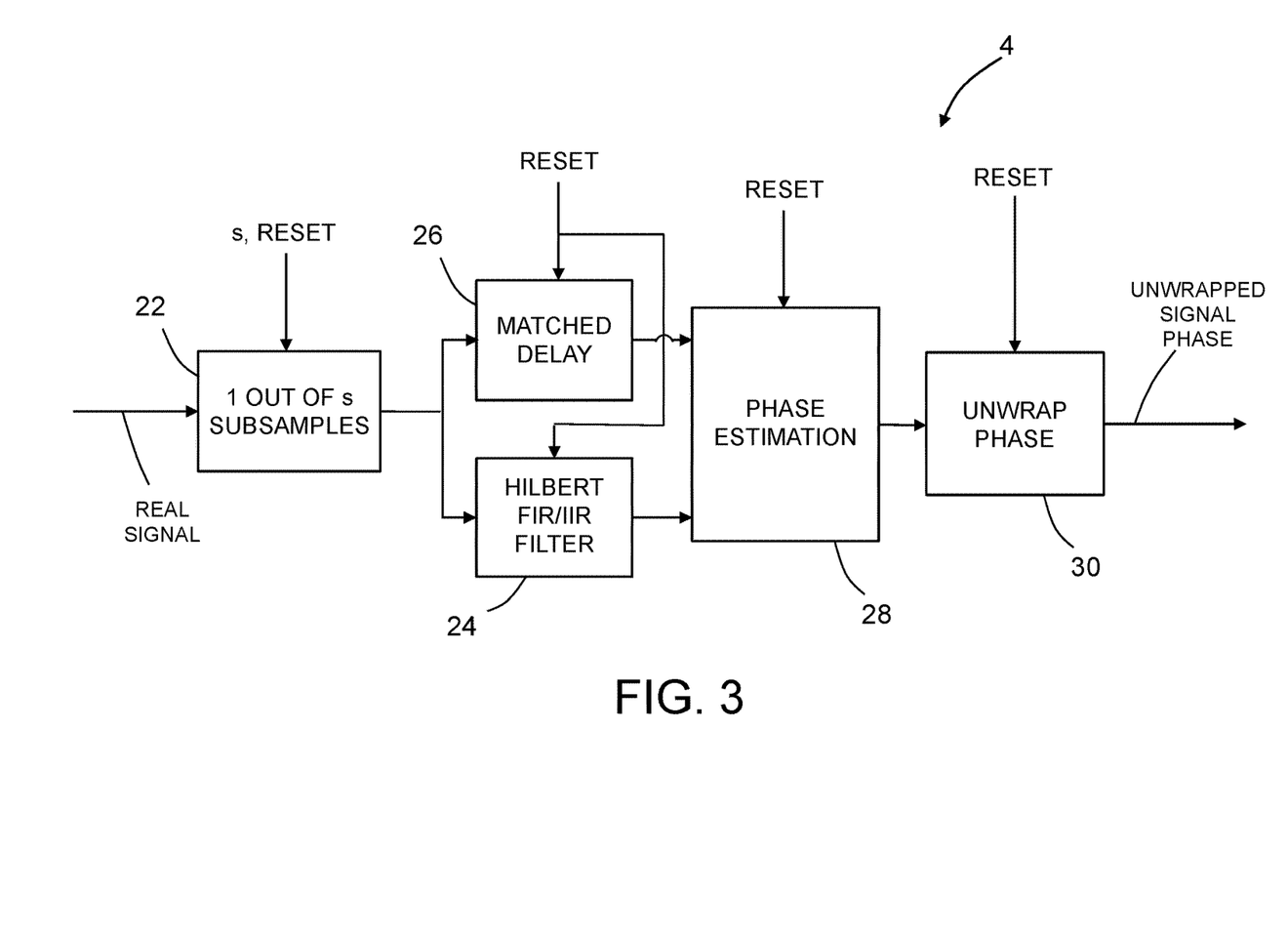
FIG. 3 is a block diagram identifying components of a subsystem for obtaining unwrapped signal phase estimates in accordance with one embodiment.

FIG. 3 shows how the overall unwrapped signal phase estimation is done for a real-valued signal. Each step is based on widely known methods and is described in the following three paragraphs.

Subsampling. The phase modulation method disclosed herein can operate under any type of sub-sampling (performed by sub-sampler 22 in FIG. 3) since they operate in the time domain. The only requirement is that the sub-sampled signal does not introduce unwanted signal frequencies. Typically this is done so that the sample rate is reduced to slightly more than twice the measured bandwidth of the signal. By reducing the sampling rate into the phase modulation detection and estimation processing, processing resources can be saved and the operation is more efficient. In particular, processing elements can be run slower or shared among a number of processing streams. This is done under the control of the PDW generation control module 2.

Phase Estimation. The phase modulation detection and estimation method disclosed herein requires knowledge of the instantaneous phase of the incoming signal at each sample. Therefore this phase must be estimated. If the incoming digital signal is complex valued, the phase can be computed as a tan 2(im; re), where the complex signal sample is of the form (re+i(im)). The function a tan 2 is the arctangent function with two arguments. For any real number (e.g., floating point) arguments x and y not both equal to zero, a tan 2(y, x) is the angle in radians between the positive x-axis of a plane and the point given by the coordinates (x, y) on it. There are simplifications to calculating phase that are easier to implement in practice than a full calculation of the a tan 2( ) function. Alternate methods include: CORDIC (for COordinate Rotation DIgital Computer, which is a simple and efficient algorithm to calculate hyperbolic and trigonometric functions, typically converging with one digit (or bit) per iteration), lookup tables and interpolation, and Chebyshev approximation. These are not further described herein since they are well known and standard. If, however, the incoming signal is real, as would be the case with the blind separated signals, the instantaneous phase must be estimated and the usual method involves using a Hilbert filter 24. In the embodiment depicted in FIG. 3, an analytic signal is formed using a Hilbert filter 24 and a matched delay 26 arranged in parallel. The matched delay 26 provides a delay that matches the delay produced by the Hilbert filter 24. The delayed (real) and filtered (imaginary) signals are output in parallel to a phase estimator 28, which estimates the phases of the streaming signals. (Note that a normalized phase between −1 and 1 is used in what follows, rather than −π and π.)

Unwrapping Phase. The signal phases output by phase estimator 28 are then unwrapped by a phase unwrapper 30. (As used herein, the verb "to unwrap" means to add 2π for each complete cycle of the sinusoidal signal.) Unwrapping of phase can be done in several different standard ways. A common and simple approach is to do the following: given a phase estimate θ and the previous phase sample $\theta_0$, correct the phase estimate θ by adding multiples of ±2π (or ±1 if normalized) when (θ−$\theta_0$) is less than −π (normalized −1) (respectively greater than π (normalized +1)).

Figure 4:
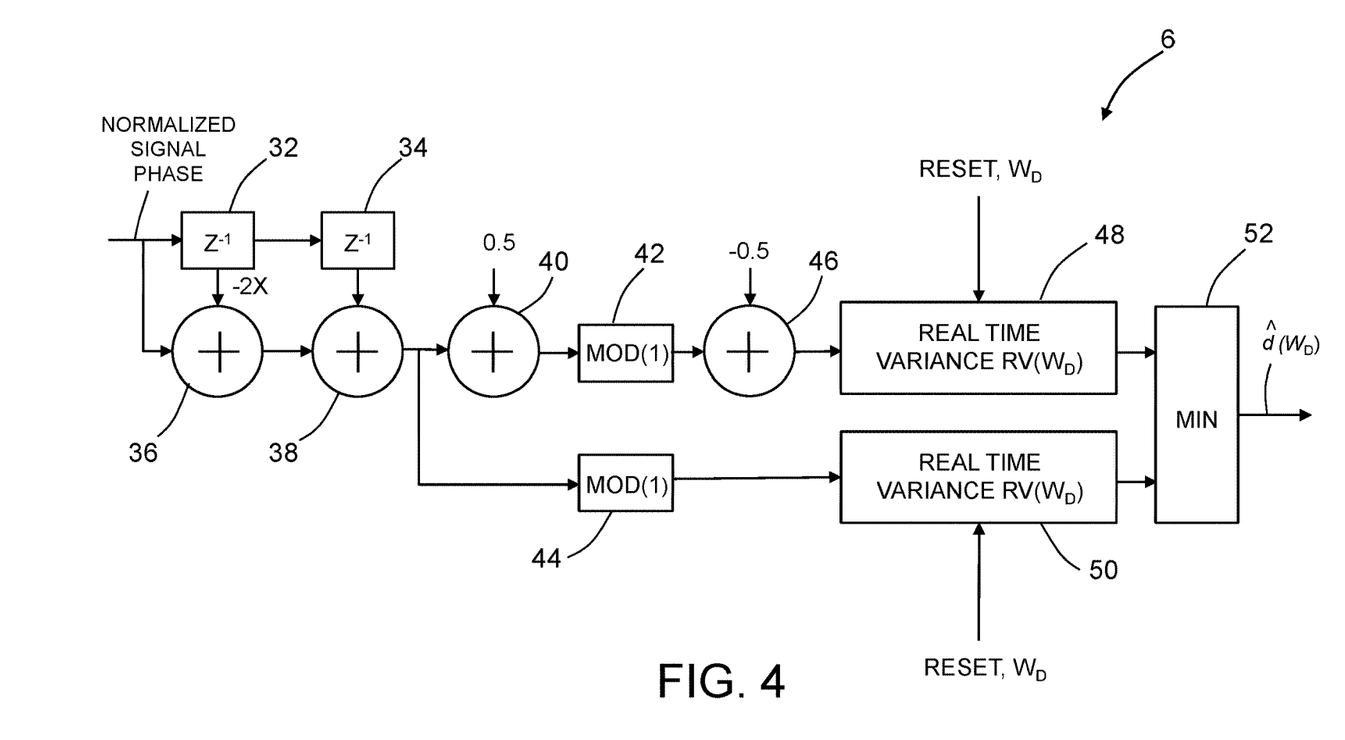
FIG. 4 is a flowchart identifying steps of a method for streaming detection of linear chirp signals in accordance with one embodiment.

FIG. 4 is a flowchart identifying steps performed by the phase modulation detector 6 (see FIG. 2) in accordance with one embodiment. The notation is as follows: $Z^{-1}$ denotes a register or memory element (i.e., registers 32 and 34 in FIG. 4) which also serves to delay a value by one clock period; the encircled "+" symbols denote summation (i.e., summers 36, 38, 40 and 46); Mod(1) denotes respective modulo 1 circuits 42 and 44 configured to perform the standard digital modulo 1 computation of each normalized value between −1 and 1 (this happens naturally in digital arithmetic circuits); and RV($W_D$) denotes respective variance estimation circuits 48 and 50 configured to perform real-time windowed variance estimation (described in more detail below) in parallel based on the respective signals output by summer 46 and modulo 1 circuit 44. (A variance is the expectation of the squared deviation of a random variable from its mean, and it informally measures how far a set of (random) numbers are spread out from their mean.) The two variance calculations are based on two possible phase paths offset by π/2. This allows the variance calculation to work correctly even when the angles are near the extremes of +1 and −1. A minimum variance circuit 52 receives the outputs from the variance estimation circuits 48 and 50, selects the minimum of the two inputs, and then outputs the detection value $\hat{d}(W_D)$.

The phase modulation detection process shown in FIG. 4 comprises: (1) a new real-time windowed variance estimation method using very few resources and no divisions and suitable for hardware implementation; and (2) the use of a parallel streaming computation that can pick the best modulo value within a window of samples. This reduces the overall detection latency over other methods.

The foregoing approach is based on the fact that a quadratic polynomial sampled function $\{Q_i\}$ has a constant second difference, i.e., $\Delta^2\{Q_i\}=Q_{i+2}-2Q_{i+1}+Q_i$ is constant without noise. (A quadratic polynomial is a polynomial function that contains terms of at most second degree.) Thus measuring the variance of a noisy quadratic sampled function gives a measure of how non-constant a noisy second difference would appear. Since a polynomial function of phase (normalized between 1 and −1) is being measured, phase would wrap at those end points and this would complicate the problem. For example, a phase of 0.9 that advances by 0.2 on the next sample would become 1.1, which wraps to −0.9. Thus phase near the end points would jump in value and this would cause jumps in the second difference, even though it should be constant. To eliminate this problem, two computational channels are provided which measure phase and phase offset by ½. Thus one of the two should have few or no jumps and thus the minimum of the variance is taken as the metric to determine detection. It is easily generalizable to non-linear chirps, i.e., polynomials of any degree d, by computing the d-th difference $\Delta^d$.

Along with the detection of the phase modulation, an estimate of SNR is also available from this method. Specifically, an SNR value can be estimated using the value $\hat{d}(W_D)$ of the minimum variance by interpolating from a look-up table. Specifically, this can be done by simulation to create a table of values that map $\hat{d}$ to SNR (dB). The SNR value can be made available for other signal processing (since some algorithms benefit a great deal by having an SNR estimate) by adding this value to the PDW generation output vector.

To compute variance in real time, several methods have been proposed by others. These methods allow on-line calculation of variance and have good floating point numerical performance. However, they are not appropriate for hardware implementation and do not specifically use a sample window. A method is proposed herein in which a sequence of variances $\{v_n\}$ are computed over a sample window of length m=$W_D$ based on the following two iterative equations for an input sequence $\{x_n\}$ with a window length of m=$W_D$:

$$S_n = S_{n-1} + x_n - x_{n-m}$$

$$v_n = v_{n-1} + x_n(x_n - S_{n-1}) - x_{n-m}(S_n - x_{n-m})$$

Figure 5:
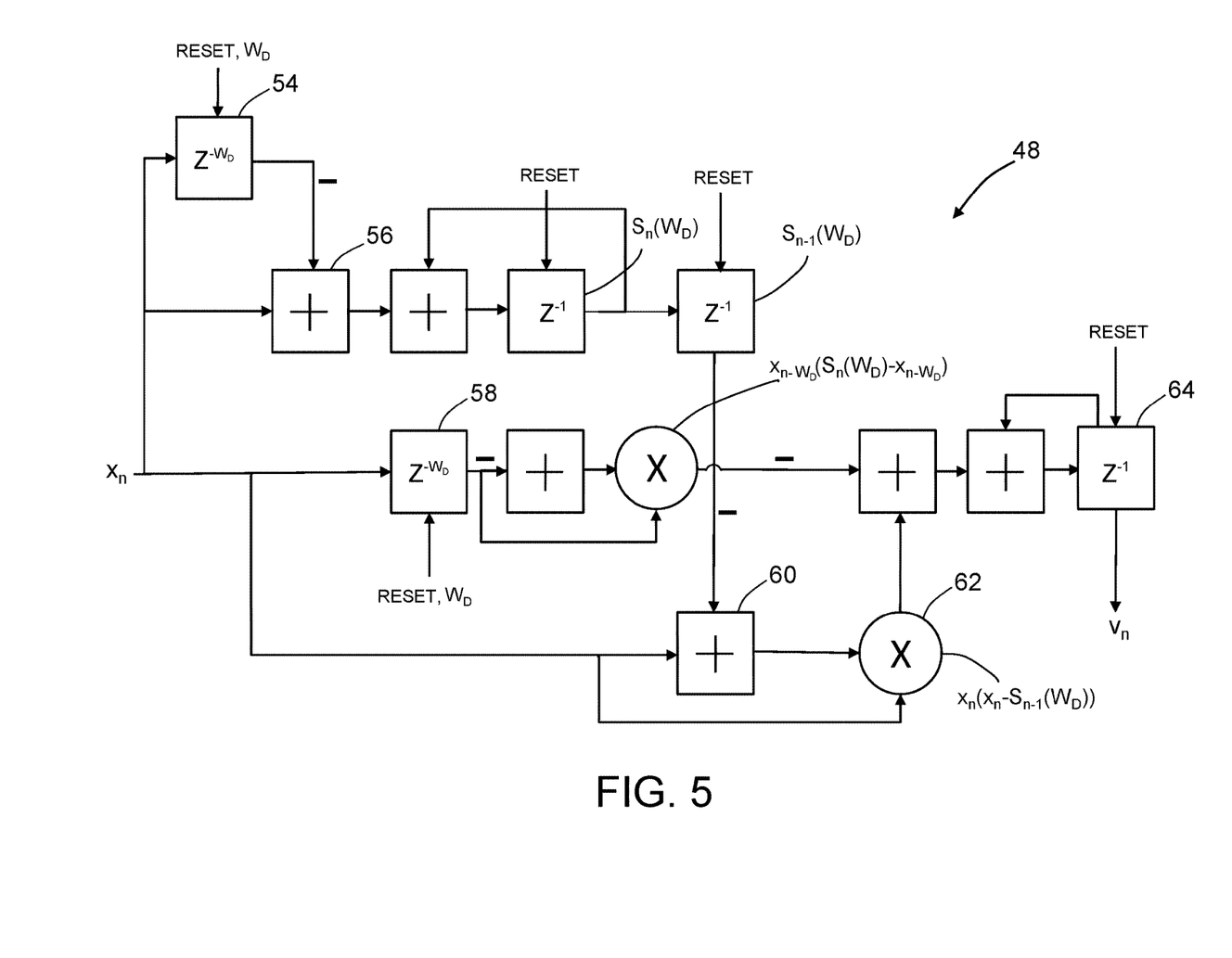
FIG. 5 is a diagram symbolically representing electronic circuitry for computing variance in real time in accordance with the detection method depicted in FIG. 4.

FIG. 5 shows how to efficiently implement the variance estimator 48 (see FIG. 4) in hardware or firmware (e.g., an ASIC or FPGA) so that only six adders (each indicated by respective "+" symbol), two multipliers (each indicated by a respective "x" symbol), three registers (each indicated by a respective $Z^{-1}$) and two delay buffers (each indicated by a respective $Z^{-W_D}$). Here $Z^{-W_D}$) denotes a delay buffer which can be programmed for different delay values (up to some implementation-dependent maximum) where the delay is set to the current detection window length $W_D$. The signal samples $x_n$ are input in parallel to delay buffers 54 and 58, adders 56 and 60, and multiplier 62. The functionality of the electronic circuitry represented by unnumbered adders, multipliers and registers in FIG. 5 is self-evident from the drawing. The variances $v_n$ are output from the register 64. The variance estimation process 50 (see FIG. 4) can be implemented using the same electronic circuitry.

The phase modulation parameter estimator 8 reduces to simply estimating the coefficients of a polynomial $p_D(t)$ that best fits unwrapped signal phase data $\{\theta_i\}$ for a given set of time/sample values, as given from Eq. (2). Polynomial regression is a form of regression analysis in which the relationship between the independent variable x and the dependent variable y is modeled as an n-th degree polynomial in x. Polynomial regression provides a standard way to accomplish this and it can be done in a streaming fashion. However, standard streaming methods are not suitable because data that is far enough back in time should be ignored since signals can change over time. This disclosure instead describes a windowed method that only uses data within a specified time window. The length of this detection window will be denoted by $W_D$. What follows is one embodiment of a windowed iteration method and circuit to implement polynomial regression for parameter estimation.

Before covering the equations suitable for a linear chirp, the simpler case of degree 1 will be covered. Linear regression for a degree 1 polynomial finds the linear equation y=ax+b that best fits a set of data $\{x_i, y_i\}$. The estimated coefficients are denoted by $\{\hat{a},\hat{b}\}$. In the case of finding the best phase match using a linear equation $\theta$=at+b for a data set $\{t_i, \theta_i\}$, one can reference everything to the sample rate and simply use the model $\theta$=ai+b. The matrix equation for linear regression where the sums are over a window of data indexed by i=1, 2, . . . , m is given by:

$$\begin{bmatrix} \sum x_i^2 & \sum x_i \\ \sum x_i & \sum 1 \end{bmatrix} \begin{bmatrix} \hat{a} \\ \hat{b} \end{bmatrix} = \begin{bmatrix} \sum x_i y_i \\ \sum y_i \end{bmatrix}$$

where $$M = \begin{bmatrix} \sum x_i^2 & \sum x_i \\ \sum x_i & \sum 1 \end{bmatrix}$$

Setting $x_i=i$ and $y_i=\theta_i$ in the above equation, this simply reduces to a pair of linear equations:

$$\hat{a}=A_1\Sigma i\theta_i+A_2\Sigma\theta_i$$

$$\hat{b}=B_1\Sigma i\theta_i+B_2\Sigma\theta_i$$

for constants $A_1$, $A_2$, $B_1$ and $B_2$.

In the context of operating on a window of data of length $m=W_D$ at each time step, this results in an iteration that can be put in the following form suitable for hardware implementation:

$$Sy_n=Sy_{n-1}+\theta_n-\theta_{n-m} \quad (3)$$

$$\hat{a}_n=\hat{a}_{n-1}+A_1(m)(m\theta_n-Sy_{n-1})+A_2(m)(\theta_n-\theta_{n-m}) \quad (4)$$

$$\hat{b}_n=\hat{b}_{n-1}+B_1(m)(m\theta_n-Sy_{n-1})+B_2(m)(\theta_n-\theta_{n-m}) \quad (5)$$

Figure 6:
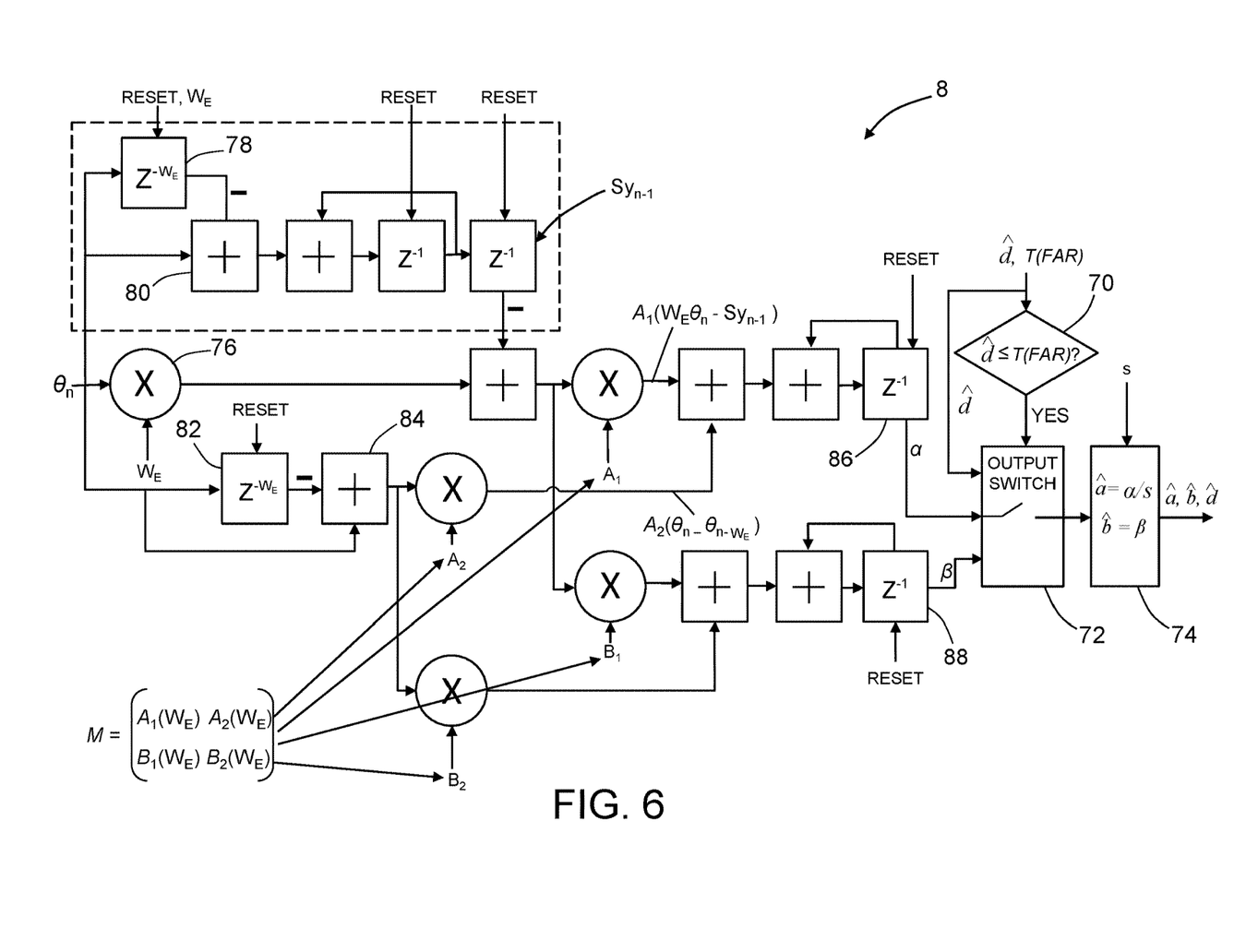
FIG. 6 is a diagram symbolically representing electronic circuitry for performing a windowed iteration method to implement polynomial regression for parameter estimation in accordance with one embodiment.

Here the four coefficients $A_1$, $A_2$, $B_1$ and $B_2$ are only dependent on the estimation window length $m=W_E$. FIG. 6 is a symbolic representation of electronic circuitry for performing a windowed iteration method to implement polynomial regression for parameter estimation using Eqs. (3)-(5). Note that the two quantities $(m\theta_n-Sy_{n-1})$ and $(\theta_n-\theta_{n-m})$ in parentheses are duplicated in both of Eqs. (4) and (5), so the computation can be shared.

In accordance with one embodiment, the phase modulation parameter estimator 8 can be implemented using electronic circuitry configured as symbolically depicted in FIG. 6. Also, FIG. 6 shows the loading of the coefficients $A_1$, $A_2$, $B_1$ and $B_2$ and resetting of register values coming from the PDW generation control module 2 (see FIG. 2). This is one method for initializing the iteration equations. However, other methods such as in-place computation could be used. Also note that other sample indexing can be used for convenience, such as $x_i=i-1$. This slightly changes Eqs. (3)-(5) above, but not the essential method.

Still referring to FIG. 6, each square labeled with a "+" symbol represents a respective adder (there are eight adders); each circle labeled with a "x" symbol) represents a respective multiplier (there are five multipliers); each rectangle labeled with a $Z^{-1}$ represents a respective register (there are four registers); and each rectangle labeled with a $Z^{-W_1}$ denotes a respective delay buffer (there are two delay buffers) which can be programmed for different delay values (up to some implementation-dependent maximum), where the delay is set to the current estimation window length $W_E$. The signal phases $\theta_n$ from the unwrapped signal phase estimator 4 are input in parallel to multiplier 76, delay buffers 78 and 82, and adders 80 and 84. The functionality of the electronic circuitry represented by unnumbered adders, multipliers and registers in FIG. 6 is self-evident from the drawing. The registers 86 and 88 output signals $\alpha$ and $\beta$ to respective inputs of an output switch 72. The output switch also receives the detection values $\hat{d}$ output by the phase modulation detector 6. The detection values $\hat{d}$ are tested in a decision circuit 70 to determine whether $\hat{d}(W_D)$ ≤T(FAR) or not. If a determination is made in decision block 70 that the detection value $\hat{d}$ is less than or equal to the detection constant T(FAR), then the output switch 72 is opened and the signals $\alpha$ and $\beta$ are not passed through to a computation block 74. If a determination is made in decision block 70 that the detection value $\hat{d}$ is greater than the detection constant T(FAR), then the detection value $\hat{d}$ and the signals $\alpha$ and $\beta$ are passed by output switch 72 to a computation block 74. The computation block 74 comprises circuitry that uses the $\alpha$ and $\beta$ values and the sub-sampling factor s to compute $\hat{a}=\alpha/s$ and $\hat{b}=\beta$. The detection value $\hat{d}$ is passed through the computation block 74.

With regard to the computation $\hat{a}\alpha/s$, the reported valves that define how the chirp changes must be normalized by the subsampling rate s so that all reported values are consistent at the full sample rate. For example, if the subsampling rate is s times slower, $\hat{a}$ must be s times smaller at the higher sample rate for the constant frequency rate.

Similarly, the matrix equation for quadratic polynomial regression suitable for parameter estimation of linear chirps is:

$$\begin{bmatrix} \sum x_i^4 & \sum x_i^3 & \sum x_i^2 \\ \sum x_i^3 & \sum x_i^2 & \sum x_i \\ \sum x_i^2 & \sum x_i & \sum 1 \end{bmatrix} \begin{bmatrix} \hat{a} \\ \hat{b} \\ \hat{c} \end{bmatrix} = \begin{bmatrix} \sum x_i^2 y_i \\ \sum x_i y_i \\ \sum y_i \end{bmatrix}$$

where $$M = \begin{bmatrix} \sum x_i^4 & \sum x_i^3 & \sum x_i^2 \\ \sum x_i^3 & \sum x_i^2 & \sum x_i \\ \sum x_i^2 & \sum x_i & \sum 1 \end{bmatrix}$$

One can use the same methodology to find a set of five iteration equations for the linear chirp phase estimation. This can more generally be done for a polynomial of any degree. Here is the iteration for the quadratic polynomial regression that supports finding the coefficients for the linear chirp in Eq. (2) with $x_i = i$:

$$Sy_n = Sy_{n-1} + \theta_n - \theta_{n-m}$$

$$Sxy_n = Sxy_{n-1} - Sy_{n-1} + m\theta_n$$

$$\hat{a}n = \hat{a}_{n-1} + A_1(m)(-2Sxy_{n-1} + Sy_{n-1} + m\theta_n) + A_2(m)(-Sy_{n-1} + m\theta_n) + A_3(m)(\theta_n - \theta_{n-m})$$

$$\hat{b}n = \hat{b}_{n-1} + B_1(m)(-2Sxy_{n-1} + Sy_{n-1} + m\theta_n) + B_2(m)(-Sy_{n-1} + m\theta_n) + B_3(m)(\theta_n - \theta_{n-m})$$

$$\hat{c}n = \hat{a}_{n-1} + C_1(m)(-2Sxy_{n-1} + Sy_{n-1} + m\theta_n) + C_2(m)(-Sy_{n-1} + m\theta_n) + C_3(m)(\theta_n - \theta_{n-m})$$

Here the nine values $A_1(m)$-$A_3(m)$, $B_1(m)$-$B_3(m)$ and $C_1(m)$-$C_3(m)$ making up the 3×3 matrix M are only dependent on the estimation window length $m = W_E$ and the PDW generation control module can pre-compute these values and load them into the estimation circuit, just as with the four values $A_1(m)$, $A_2(m)$, $B_1(m)$ and $B_2(m)$ in the previous section. The values do not need to be changed until the window length changes. Although the specific circuit is not shown in the drawings, it is similar to the circuitry symbolically depicted in FIG. 6.

The method of detection and estimation disclosed herein can be operated on any chosen sub-sequence with fixed sample rate. In other words, if $\{\theta_i\}$ is the sequence of phases coming from a real or complex signal $\{x_i\}$, then both detection and parameter estimation can operate on input of the form $\{\theta_{si+q}\}$, where s and q are chosen positive integers taken from a sub-sequence of the input signal $\{x_{si+q}\}$. This enables a tradeoff between processing and the aliasing of the parameter estimates that come from the method disclosed herein. Thus it is possible to choose processing sub-sequences that reduce the computations by a factor of s. Specifically:

1. The phase modulation detection process for sub-sequences can be done uses the same algorithm. The reduction in sample rate has the effect of only increasing the latency of the detection slightly.

2. The phase modulation parameter estimation process for sub-sequences can be done using the same algorithm with a simple modification of the parameter values before output by the PDW generation output module as shown in FIG. 6. FIG. 6 shows the constant frequency case with a sub-sampling factor of s, where the only modification is for the first coefficient $\hat{a} \rightarrow \hat{a}s^2$ and $\hat{b}$ is unaffected. For the linear chirp case and a sub-sampling factor of s, the modification is $\hat{b} \rightarrow \hat{b}s$ and $\hat{a} \rightarrow \hat{a}s^2$ and $\hat{c}$ is unaffected.

Figure 7:
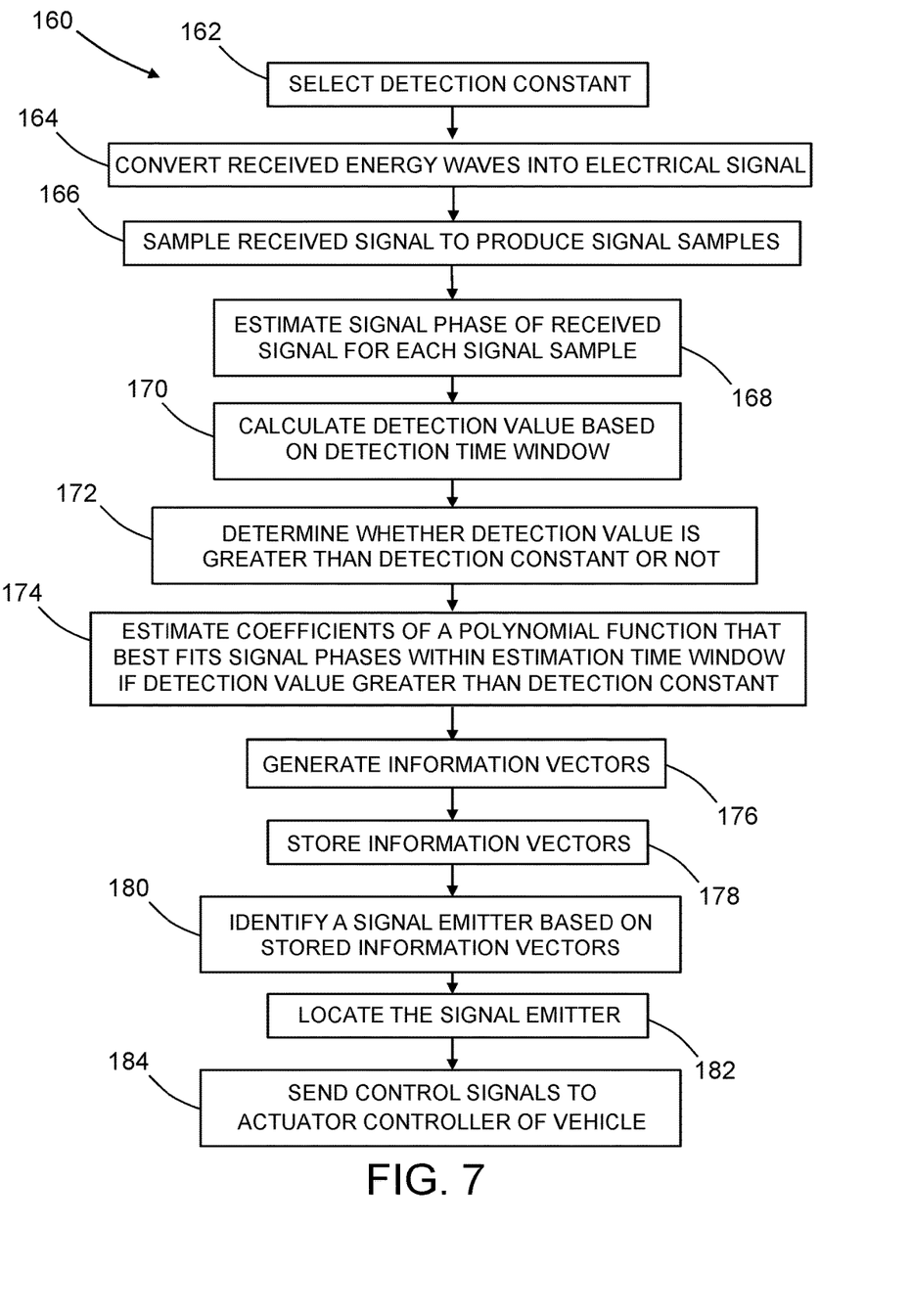
FIG. 7 is a flowchart identifying steps of a method for controlling the movement of a vehicle based on information acquired concerning signals received from a signal emitter.

In one application, the information contained in the PDW parameter vector signals 138 can be used to control the movement of a vehicle (e.g., to approach or avoid a signal emitter). FIG. 7 is a flowchart identifying steps of a method 160 for controlling the movement of a vehicle based on information acquired concerning signals received from the signal emitter. In accordance with the embodiment depicted in FIG. 7, the method 160 comprises the following steps: (a) selecting a detection constant associated with a false alarm rate (step 162); (b) converting received energy waves into electrical signals (step 164); (c) sampling a received signal to produce signal samples (step 166); (d) estimating a respective instantaneous signal phase of the received signal for each signal sample (step 168); (e) calculating a detection value based on a detection time window of a first specified length of the signal samples (step 170); (f) determining whether the detection value is greater than the detection constant or not (step 172); (g) estimating coefficients of a polynomial function that best fits the instantaneous signal phases estimated in step 166 within an estimation time window of a second specified length only if the detection value is greater than the detection constant (step 174); (h) generating information vectors comprising respective data sets of parameter values of received signals, wherein each data set of parameter values making up an information vector comprises the coefficients estimated in step 174 (step 176); (i) storing the data sets of parameter values of the information vectors generated in step 176 in a non-transitory tangible computer-readable storage medium (step 178); (j) identifying a signal emitter 106 or 107 (see FIG. 1) based on the stored data sets of parameter values (step 180); (k) locating the signal emitter 106 or 107 (step 182); and (l) sending control signals to an actuator controller 150 of a vehicle 146 (see FIG. 1), which control signals direct a movement of the vehicle 146 based on a location of the signal emitter (step 184).

Certain systems, apparatus, applications or processes are described herein as including a number of modules. A module may be a unit of distinct functionality that may be implemented in software, hardware, or combinations thereof, except for those portions of the PDW generation module 128 which are hardware or firmware to enable streaming calculations as disclosed herein. When the functionality of a module is performed in any part through software, the module can include a non-transitory tangible computer-readable storage medium. The modules may be regarded as being communicatively coupled.

While systems and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, processing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device".

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for estimating parameters of a phase-modulated signal in a streaming manner, comprising:
   (a) sampling a received signal to produce signal samples;
   (b) estimating a respective instantaneous signal phase of the received signal for each signal sample in a streaming manner using first electronic circuitry configured to perform phase modulation detection in real- time;
   (c) estimating coefficients of a polynomial function that best fits the instantaneous signal phases estimated in step (b) within an estimation time window of a first specified length in a streaming manner using second electronic circuitry configured to perform phase modulation parameter estimation in real-time, the second electronic circuitry receiving streaming estimated instantaneous signal phases from the first electronic circuitry;
   (d) calculating a detection value based on a detection time window of a second specified length of the signal samples;
   (e) comparing the detection value to a detection constant; and
   (f) discontinuing step (c) in response to the detection value being less than the detection constant.

2. The method as recited in claim 1, wherein the coefficients are estimated in step (c) using polynomial regression.

3. The method as recited in claim 1, wherein the coefficients are estimated in step (c) without using Fourier transforms.

4. The method as recited in claim 1, further comprising:
   generating information vectors comprising respective data sets of parameter values of received signals, wherein each data set of parameter values making up an information vector comprises the coefficients estimated in step (c); and
   storing the data sets of parameter values of the information vectors in a non-transitory tangible computer-readable storage medium.

5. The method as recited in claim 1, wherein step (d) comprises real-time windowed variance estimation.

6. The method as recited in claim 5, wherein step (d) further comprises a parallel streaming computation that acquires a best modulo value within the detection time window of signal samples.

7. The method as recited in claim 1, wherein step (a) comprises sub-sampling.

8. The method as recited in claim 1, wherein step (b) comprises converting the signal samples into filtered and delayed signals using a Hilbert filter and a matched delay arranged in parallel.

9. The method as recited in claim 8, wherein step (b) further comprises applying a phase estimation technique to the delayed and filtered signals output in parallel by the matched delay and Hilbert filter, wherein the phase estimation technique involves use of one of the following phase estimators: the arctangent function, CORDIC, look-up tables and interpolation, and Chebyshev approximation.

10. The method as recited in claim 9, wherein step (b) further comprises unwrapping the signal phases output by the phase estimator.

11. A method for estimating parameters of a phase-modulated signal in a streaming manner, comprising:
   (a) sampling a received signal to produce signal samples;
   (b) estimating a respective instantaneous signal phase of the received signal for each signal sample;
   (c) estimating coefficients of a polynomial function that best fits the instantaneous signal phases estimated in step (b) within an estimation time window of a first specified length;
   (d) generating information vectors comprising respective data sets of parameter values of received signals, wherein each data set of parameter values making up an information vector comprises the coefficients estimated in step (c);
   (e) storing the data sets of parameter values of the information vectors in a non-transitory tangible computer- readable storage medium;
   (f) identifying a signal emitter based on the stored data sets of parameter values;
   (g) locating the signal emitter; and
   (h) sending control signals to an actuator controller of a vehicle, which control signals direct a movement of the vehicle based on a location of the signal emitter.

12. A method for detecting a phase-modulated signal in a streaming manner, comprising:
   (a) selecting a detection constant associated with a false alarm rate;
   (b) sampling a received signal to produce signal samples;
   (c) estimating a respective instantaneous signal phase of the received signal for each signal sample;
   (d) calculating a detection value based on a detection time window of a first specified length of the signal samples;
   (e) determining whether the detection value is greater than the detection constant or not;
   (f) estimating coefficients of a polynomial function that best fits the instantaneous signal phases estimated in step (b) within an estimation time window of a second specified length only if the detection value is greater than the detection constant; and
   (g) generating information vectors comprising respective data sets of parameter values of received signals, wherein each data set of parameter values making up an information vector comprises the coefficients estimated in step (f).

13. The method as recited in claim 12, further comprising:
   (h) storing the data sets of parameter values of the information vectors generated in step (g) in a non-transitory tangible computer-readable storage medium;
   (i) identifying a signal emitter based on the stored data sets of parameter values;
   (j) locating the signal emitter; and
   (k) sending control signals to an actuator controller of a vehicle, which control signals direct a movement of the vehicle based on a location of the signal emitter.

14. The method as recited in claim 12, wherein step (d) comprises real-time windowed variance estimation.

15. The method as recited in claim 14, wherein step (d) further comprises a parallel streaming computation that acquires a best modulo value within the detection time window of signal samples.

16. A system for estimating parameters of a phase-modulated signal in a streaming manner, comprising:

a transducer for converting received energy waves into a received signal in electrical form;

a filter for passing a portion of the received signal having a frequency within a selected frequency bandwidth;

a sampler comprising hardware or firmware configured to sample the received signal output by the filter to produce signal samples;

a phase estimator comprising hardware or firmware configured to estimate a respective instantaneous signal phase of the received signal for each signal sample in a streaming manner;

a phase modulation parameter estimator comprising hardware or firmware configured to estimate coefficients of a polynomial function that best fits the instantaneous signal phases estimated by the phase estimator in a streaming manner within an estimation time window of a first specified length; and a phase modulation detector configured to calculate a detection value based on a detection time window of a second specified length of the signal samples, wherein the phase modulation parameter estimator further comprises hardware or firmware configured to determine whether the detection value is greater than the detection constant or not and to not estimate coefficients if the detection value is less than the detection constant.

17. The system as recited in claim 16, further comprising:

an information vector generation module configured to generate information vectors comprising respective data sets of parameter values of received signals, wherein each data set of parameter values making up an information vector comprises the coefficients estimated by the phase modulation parameter estimator; and a non-transitory tangible computer-readable storage medium storing the data sets of parameter values of the information vectors generated by the information vector generation module.

* * * * *